United States Patent [19]

Wagner

[11] 3,964,074
[45] June 15, 1976

[54] FLASH UNIT FOR USE WITH CAMERAS HAVING DIFFERENT TYPES OF DIAPHRAGMS AND ACCESSORY SHOES

[75] Inventor: Karl Wagner, Ottobrunn, Germany

[73] Assignee: AGFA-Gevaert, A.G., Leverkusen, Germany

[22] Filed: May 29, 1974

[21] Appl. No.: 474,430

[30] Foreign Application Priority Data

May 30, 1973 Germany............................ 2327584

[52] U.S. Cl. ................................. 354/32; 240/1.3; 354/59; 354/145
[51] Int. Cl.²......................................... G03B 7/00
[58] Field of Search............. 240/1.3, 2 C; 354/145, 354/141, 35, 32, 33, 34, 59, 149; 339/31 L, 32, 125 L; 315/151, 157, 158, 241 P

[56] References Cited
UNITED STATES PATENTS

| | | | |
|---|---|---|---|
| 3,252,394 | 5/1966 | Jakob et al. ........................ | 354/126 |
| 3,296,947 | 1/1967 | Engelsmann et al................ | 354/127 |
| 3,335,650 | 8/1967 | Schmidt.............................. | 354/126 |
| 3,457,101 | 7/1967 | Rentschler et al................. | 354/34 X |
| 3,601,022 | 8/1971 | Langnau ............................ | 354/34 |
| 3,745,323 | 7/1973 | Morse................................. | 240/1.3 |

*Primary Examiner*—L. T. Hix
*Assistant Examiner*—Kenneth C. Hutchison
*Attorney, Agent, or Firm*—Michael J. Striker

[57] ABSTRACT

An electronic flash unit having a foot which supports a depressible actuating lever for a grey filter which is moved by the lever in front of a photoelectric transducer in the casing of the flash unit when the foot is inserted into the shoe of a camera with a fixed diaphragm whose aperture is not suited for the making of exposures with flash but not when the foot is inserted into the shoe of a camera having an adjustable diaphragm capable of furnishing an f/stop which is suited for the making of exposures with flash without any adjustments of illuminating means in the casing of the flash unit. The placing of the filter in front of the transducer compensates for the fact that the aperture of the fixed diaphragm is unsatisfactory for the making of exposures with flash without any adjustments of illuminating means in the casing of the flash unit. The foot can be inserted into or withdrawn from a shoe by moving it in parallelism with or at right angles to the optical axis of the lens system in the respective camera.

9 Claims, 5 Drawing Figures

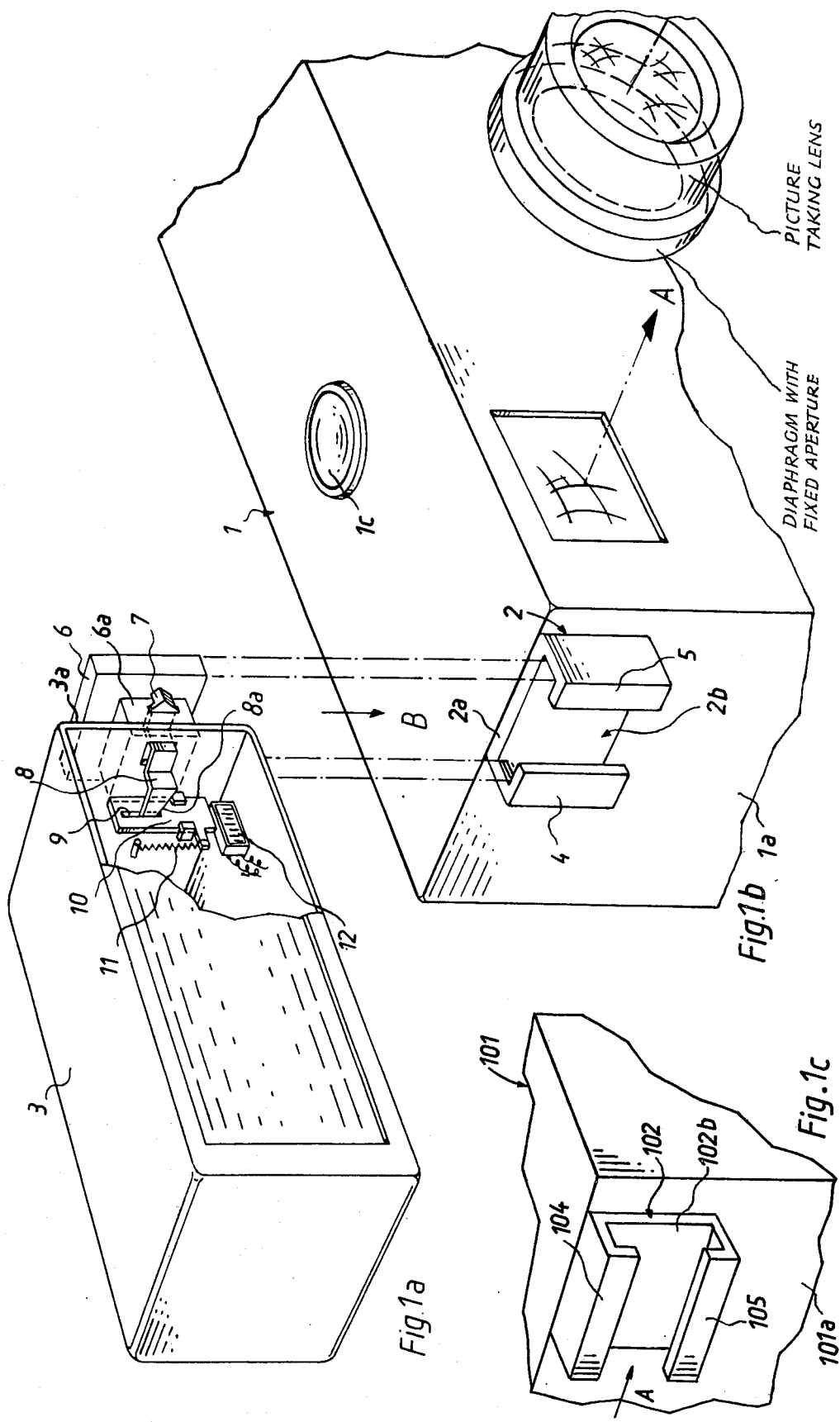

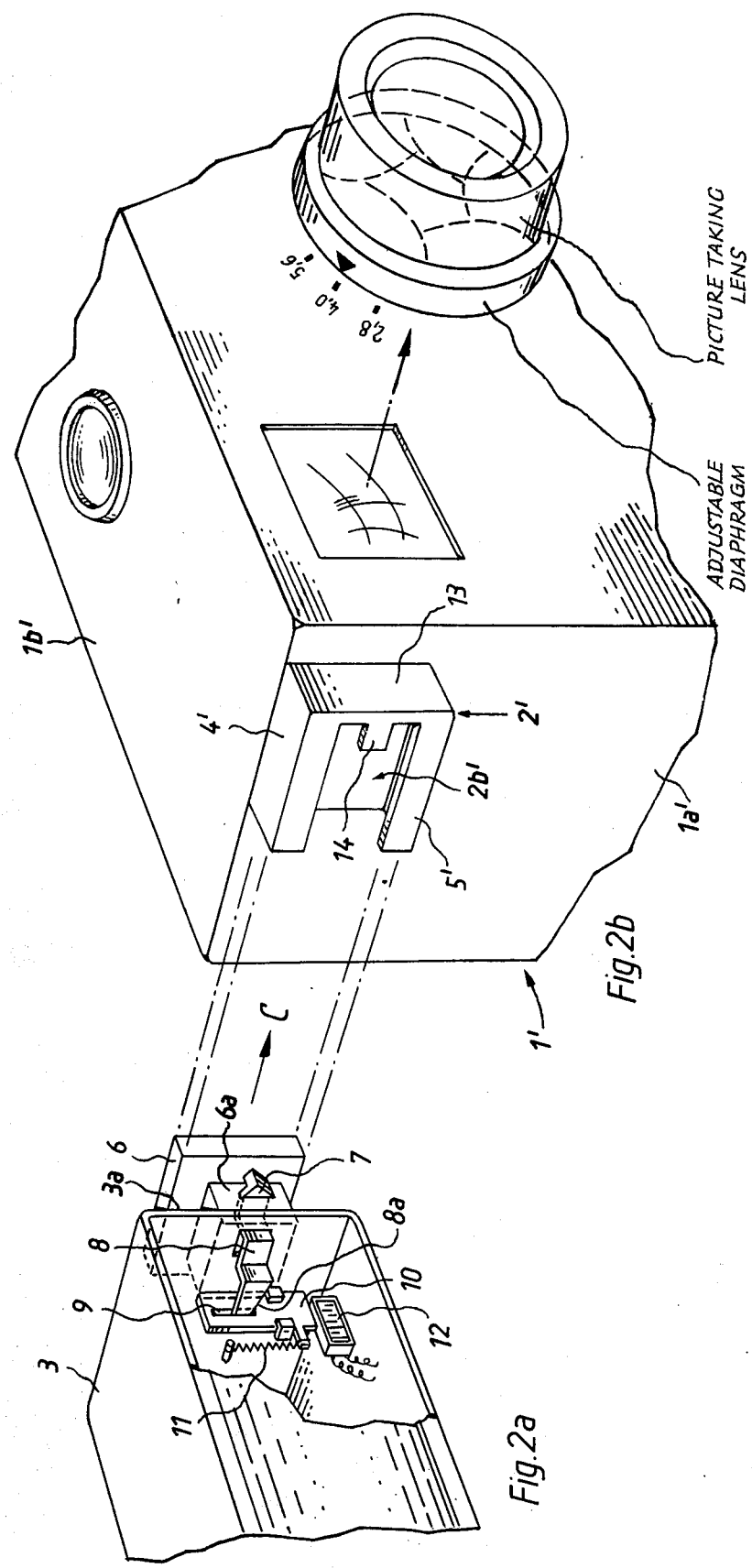

FLASH UNIT FOR USE WITH CAMERAS HAVING DIFFERENT TYPES OF DIAPHRAGMS AND ACCESSORY SHOES

BACKGROUND OF THE INVENTION

The present invention relates to photographic apparatus which can be used to make exposures with artificial illumination of the subject. More specifically, the invention relates to improvements in photographic apparatus including a source of artificial light and any one of several types of cameras.

When an electronic flash unit is attached to a camera having an adjustable diaphragm, the latter is normally adjusted, either by hand or in automatic response to attachment of the flash unit, so as to define a lightadmitting aperture whose size is best suited for the making of exposures with artificial illumination of the subject. The f/stop which is selected for the making of exposures with flash depends primarily on the sensitivity of film in the camera body. The adjustability of diaphragm in the camera enables the user to make highly satisfactory exposures with flash because the user is in a position to select that f/stop which is best suited for the making of exposures with artificial illumination of the subject by taking into consideration the type of flash unit and/or other parameters, such as the aforementioned sensitivity of film in the camera body.

The just described flash unit cannot be used with or on a camera which does not have an adjustable diaphragm, i.e., wherein the single f/stop furnished by such nonadjustable diaphragm is not ideally suited (or is totally unsuited) for the making of exposures with flash. The same applies for cameras wherein the diaphragm is adjustable but can furnish only a limited number of f/stops not a single one of which is satisfactory for the making of acceptable exposures with flash.

SUMMARY OF THE INVENTION

An object of the invention is to provide a photographic apparatus including a source of artificial light (such as a computerized electronic flash unit) and one of two or more different types of cameras at least one of which includes diaphragm which is incapable of furnishing an f/stop which is best suited for the making of exposures with artificial illumination of the subject in the absence of any adjustments of the source.

Another object of the invention is to provide the cameras which can be used with the source of artificial light with novel and improved accessory shoes for the foot on the casing of the source.

A further object of the invention is to provide the source of artificial light with a novel and improved foot and with novel and improved adjusting means for the illuminating means in the casing of the source.

An additional object of the invention is to provide an electronic flash unit or an analogous source of artificial light which can be used with different types of cameras without necessitating any adjustments on the part of the operator.

Still another object of the invention is to provide an electronic flash unit which can be used (a) with cameras having diaphragms capable of furnishing a single f/stop which is not satisfactory for the making of exposures with artificial illumination of the subject by resorting to conventional flash units, (b) with cameras whose diaphragms are adjustable so that they can furnish an optimum f/stop for the making of exposures with flash, or (c) with cameras having adjustable diaphragms which are capable of furnishing several f/stops neither of which is best suited for the making of exposures with artificial illumination of the subject by resorting to conventional flash units.

The invention is embodied in the combination of a first camera having a first diaphragm and a first accessory shoe or a second camera having an adjustable second diaphragm and a different second accessory shoe with a source of artificial light including adjustable illuminating means, a foot which is insertable into the first or second shoe, and adjusting means which is actuatable in response to insertion of the foot into the first shoe but not in response to insertion of the foot into the second shoe so that the illuminating means is adjusted in response to insertion of the foot into the first shoe whereby such adjustment compensates for the fact that the f/stop or f/stops furnished by the first diaphragm are not satisfactory for the making of exposures with artificial illumination of the subject in the absence of any adjustments of illuminating means.

The source of artificial light preferably further comprises actuating means for the adjusting means, and such actuating means may comprise a lever, a slide, a rack or a rotary member which is displaced by the first shoe during insertion of the foot but is not displaced by the second shoe so that the illuminating means can be adjusted only when necessary, i.e., when the source of artificial light is to be used with the first camera.

The novel features which are considered as characteristic of the invention are set forth in particular in the appended claims. The improved combination itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1a is a fragmentary perspective partly sectional view of an electronic flash unit with adjustable illuminating means which can be used in accordance with the invention;

FIG. 1b is a fragmentary perspective view of a first camera which can be used with the flash unit of FIG. 1a;

FIG. 1c is a fragmentary perspective view of a second camera which can be used with the flash unit of FIG. 1a;

FIG. 2a is a fragmentary perspective partly sectional view of the flash unit of FIG. 1a; and FIG. 2b is a fragmentary perspective view of a third camera which can be used with the improved flash unit.

DESCRIPTION OF THE PREFERRED EMBODIMENTS

FIGS. 1a and 1b respectively show an electronic flash unit and a photographic camera. The housing or body 1 of the camera has a vertical side wall 1a which supports a receptacle or shoe 2 for the foot 6 of the flash unit. The latter comprises a housing or casing 3 having a vertical side wall 3a which is rigid with the foot 6. The shoe 2 comprises a median portion or web 2a which is rigid with the side wall 1a and two L-shaped flanges 4, 5 which flank the web 2a and define therewith a space 2b for reception of the foot 6. The latter is insertable into the space 2b by moving in the direction indicated by an arrow B. The optical axis A of the lens system of the camera (e.g., a simple still camera with a rudimentary diaphragm having a fixed aperture) is normal to the direction indicated by the arrow B.

The foot 6 on the side wall 3a of the casing 3 includes a smaller inner portion 6a which has a slot for an actuating lever 7. A suitably bent arm 8 of the lever 7 is located in the interior of the casing 3 and extends into a vertical slot 9 provided in an adjusting element here shown as a grey filter 10. When the actuating lever 7 is moved from the position shown in FIG. 1a, the arm 8 moves rearwardly and its lower edge face 8a displaces the adjusting element or filter 10 so that the latter moves in front of a photosensitive transducer 12 in the casing 3. A helical spring 11 is installed in the casing 3 to permanently bias the filter 10 to the illustrated idle or inoperative position in which the front face of the transducer 12 is exposed to scene light whereby the flash unit, when fixed in response to actuation of the camera release 1c, furnishes artificial light of predetermined duration and/or intensity different from that duration and/or intensity when the filter 10 extends in front of the transducer 12. By moving in front of the transducer 12, the filter 10 changes the sensitivity of the light-sensitive control circuit of illuminating means in the casing 3.

When the camera including the body 1 is to make exposures with artificial illumination of the subject, the shoe 6 is inserted into the space 2b by moving it in the direction indicated by arrow B. The exposed portion of the actuating lever 7 then strikes against the flange 5 and the actuating lever is depressed so that the arm 8 moves the adjusting filter 10 downwardly and in front of the transducer 12. This adjusts the illuminating means (including the transducer 12) of the flash unit, i.e., the placing of filter 10 in front of the transducer 12 compensates for the fact that the size of the fixed aperture of diaphragm in the body 1 of the camera is not an optimum size for the making of exposures with flash while the transducer is directly exposed to scene light.

The adjusting lever 7 can also pivot in response to insertion of the foot 6 into the space 2b; however, the illustrated lever 7 is installed in the foot portion 6a for lengthwise movement in and counter to the direction indicated by the arrow A whereby the edge face 8a slides along the surface bounding the lower end of the slot 9 and causes the adjusting filter 10 to move downwardly when the foot 6 is inserted into the shoe 2. When the foot 6 is withdrawn from the space 2b, the spring 11 pushes the filter 10 upwardly whereby the filter causes the inclined lower edge face 8a of the arm 8 to move the lever 7 forwardly to assume the position shown in FIG. 1a.

FIG. 1c shows a portion of a more sophisticated photographic camera having a housing 101 with a side wall 101a and a shoe 102 which can receive the foot 6 if the casing 3 is moved in the direction indicated by arrow A. The flanges 104, 105 remain spaced apart from the lever 7 even when the shoe 6 is received in the space 102b so that the attachment of flash unit to the camera of FIG. 1c does not result in a depression of the lever 7 and the filter 10 remains in the inoperative position shown in FIG. 1a. The diaphragm of the camera including the structure of FIG. 1a is adjustable so that the operator can select an appropriate f/stop before or subsequent to insertion of the foot 6 into the shoe 102 but prior to the making of first exposure with artificial illumination of the subject. If desired, the diaphragm in the body 101 of FIG. 1c can be adjusted in automatic response to insertion of the foot 6 into the space 102b so that the diaphragm in the body 101 automatically furnishes an optimum f/stop as soon as the flash unit of FIG. 1a is attached to the camera of FIG. 1c.

FIG. 2a illustrates the flash unit of FIG. 1a, and FIG. 2b shows a modified photographic camera having a body 1' with a side wall 1a' for a slightly different shoe 2'. This shoe resembles the shoe 102 of FIG. 1c except that it further comprises a projection 14 which extends into the path of movement of the actuating lever 7 when the shoe 6 is inserted into the space 2b' between the flanges 4' and 5'. The projection 14 then depresses the lever 7 so that the edge face 8a of the arm 8 shifts the adjusting filter 10 downwardly and simultaneously stresses the spring 11. The filter 10 moves in front of the transducer 12 and the camera including the body 1' is ready to make exposures with artificial illumination of the subject. It will be noted that the direction (arrow C) in which the shoe 6 can be inserted into the space 2b' is parallel with the optical axis (arrow A) of the lens system in the photographic camera shown in FIG. 2b. The reference character 13 denotes in FIG. 2b a transverse wall which forms part of the shoe 2' and extends between the front end portions of the flanges 4', 5'. The projection 14 is shown as forming an integral part of the wall 13.

If the flash unit of FIG. 2a is to be used with the camera including the structure of FIG. 1c, the insertion of shoe 6 into the space 102b does not result in depression of the lever 7 because the shoe 102 does not have a projection 14. It is clear that the shoe 102 may include the wall 13 of FIG. 2a, as long as this wall arrests the shoe 6 before the lever 7 is depressed.

It is further clear that the lever 7 can be used to perform other functions. For example, instead of displacing the adjusting filter 10, the arm 8 of the lever 7 can be used to actuate an adjusting switch in the casing 3 whenever the shoe 6 is inserted into the shoe 2 or 2' whereby the switch changes the capacitance of a conventional charging capacitor forming part of illuminating means in the casing 3 of the flash unit.

It is also within the purview of the invention to mount the accessory shoes on the top walls of the respective camera bodies and to mount the foot 6 at the underside of the casing of the flash unit. For example, and referring to FIGS. 2a and 2b, the accessory shoe 2' can be mounted on the top wall 1b' of the body 1' if the foot 6 is mounted at the underside of the casing 3. The projection 14 then depresses the lever 7 when the shoe 6 is fully received in the space 2b' of the shoe 2'. Such projection is omitted in a shoe which corresponds to the shoe 102 of FIG. 1c but is mounted on the top wall of a camera having an adjustable diaphragm which can furnish several f/stops including an f/stop which is best suited for the making of exposures with flash so that the illuminating means of the flash unit need not be adjusted during attachment of the flash unit to the body of such camera.

The actuating lever 7 of the flash unit shown in FIGS. 1a and 2a (or an analogous source of artificial light) need not be depressed by a portion of the accessory shoe 2 or 2'. For example, the projection 14 of FIG. 2b can be mounted on the side wall 1a' independently of the shoe 2', as long as it is capable of displacing the lever 7 (or an analogous actuating member) in response to insertion of the foot 6 into the shoe 2'.*)

*) An electronic flash unit which can be modified to constitute the flash unit of FIG. 1a or 2a is disclosed, for example, in U.S. Pat. No. 3,340,426.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. The combination of a camera having a fixed diaphragm and an accessory shoe with a source of artificial light including adjustable illuminating means, said illuminating means comprising a photoelectric transducer which is normally exposed to scene light; a foot which is insertable into said shoe; adjusting means for said illuminating means, said adjusting means having a filter and being actuatable by said camera to thereby adjust said illuminating means in automatic response to insertion of said foot into said shoe; and displaceable actuating means for said adjusting means, said actuating means being provided on said foot and being displaceable by said camera in response to insertion of said foot into said shoe, said filter being movable in front of said transducer in response to displacement of said actuating means.

2. The combination of claim 1, wherein said source constitutes an electronic flash unit.

3. The combination of claim 1, wherein said shoe comprises means for displacing said actuating means in response to insertion of said foot into said shoe.

4. The combination of claim 1, wherein said actuating means comprises a lever having means for moving said filter in front of said transducer in response to displacement of said lever as a result of insertion of said foot into said shoe.

5. The combination of claim 1, wherein said camera further includes a picture taking lens having an optical axis and said foot is configured to be insertable into said shoe only in a direction substantially at right angles to the optical axis.

6. The combination of claim 5, wherein a portion of said actuating means normally extends from said foot and said shoe comprises a portion which displaces said portion of said actuating means during insertion of said foot into said shoe.

7. The combination of claim 1, wherein said camera further includes a picture taking lens having an optical axis and said foot is insertable into said shoe by moving in a direction which is parallel to the optical axis.

8. The combination of claim 7, wherein a portion of said actuating means normally extends from said foot and said camera further comprises a projection which is located in the path of movement of and displaces said portion of said actuating means during insertion of said foot into said shoe.

9. The combination of a camera having a fixed diaphragm and an accessory shoe with a source of artificial light comprising adjustable illuminating means including a light sensor which generates a signal indicative of the amount of light impinging thereon; a foot which is insertable into said shoe; and adjusting means for said illuminating means, comprising means for changing the sensitivity of said light sensor by modifying the amount of light impinging upon said sensor, said adjusting means being actuatable by said camera to thereby adjust the amount of light sensed by said light sensor and therefore the magnitude of the signal generated thereby and conducted towards said illuminating means, in automatic response to insertion of said foot into said shoe.

* * * * *